United States Patent [19]
Powell

[11] Patent Number: 5,361,705
[45] Date of Patent: Nov. 8, 1994

[54] INTERACTIVE DRAG STRIP AMUSEMENT RIDE

[76] Inventor: Tyrone E. Powell, 2000 Otter, Anchorage, Ak. 99504

[21] Appl. No.: 146,535

[22] Filed: Nov. 1, 1993

[51] Int. Cl.⁵ ............................................. A63G 25/00
[52] U.S. Cl. ..................................................... 104/60
[58] Field of Search ................. 104/53, 60, 85, 84, 104/83; 273/86 R, 86 B; 472/85

[56] References Cited

U.S. PATENT DOCUMENTS

| | | | |
|---|---|---|---|
| 3,403,908 | 10/1968 | Sheldon et al. | 273/86 B |
| 3,410,223 | 11/1968 | Miller | 273/86 R |
| 3,565,430 | 2/1971 | McRoskey | 273/86 B |
| 3,648,454 | 3/1972 | Morrison | 273/86 R |
| 4,373,722 | 2/1983 | Kite et al. | 273/86 R |
| 4,794,865 | 1/1989 | Lindberg | 104/246 |
| 4,846,467 | 7/1989 | Rosson | 273/86 R |
| 4,872,680 | 10/1989 | Dennis | 273/86 B |
| 4,920,890 | 5/1990 | Barber | 104/53 |
| 4,991,514 | 2/1991 | Powell et al. | 104/60 |
| 5,016,540 | 5/1991 | Barber | 104/53 |
| 5,115,744 | 5/1992 | Barber | 104/75 |
| 5,127,336 | 7/1992 | Wakabayashi | 104/35 |
| 5,194,843 | 3/1993 | Jones et al. | 273/86 R |

FOREIGN PATENT DOCUMENTS 3003860  8/1981  Germany .......................... 273/86 B Primary Examiner—Mark T. Le
Attorney, Agent, or Firm—Clifford Kraft

[57] ABSTRACT

An improved, interactive drag strip amusement ride that satisfies the need for a ride where any person can safely experience the thrills of a drag race and the requirements placed on a drag race driver. It comprises an apparatus for accurately simulating a drag race from the perspective of the race driver. The driver interactively controls the acceleration, gearshifting, and braking as if in an actual drag race.

4 Claims, 6 Drawing Sheets

INTERACTIVE DRAG STRIP AMUSEMENT RIDE

BACKGROUND

1. Field of the Invention

This invention relates generally to the field of amusement rides, and more particularly to an interactive drag strip amusement ride.

2. Background of the Invention

The sport of drag racing is an acceleration contest between two cars racing from a standing start over a precisely measured, straight-line course. Unfortunately, few members of the general public are ever fortunate enough to experience the excitement and sounds of such a race from the perspective of the drag race driver. Complete concentration and exact response are required to start the race at the optimum time without starting too soon and being disqualified or starting too late and losing time. Exact control and skill are necessary to steer the car and shift gears at the proper times. Even though the race distance is usually only a quarter of a mile, the pressure on the driver during the race is extreme. A drag race is a truly remarkable experience for a driver, especially a winning driver. This is a thrill many people would seek if there were a way to experience it safely. What is badly needed is an interactive amusement ride that accurately and safely simulates a drag race for the participant.

Most people have experienced carnival rides that subject the body to various forms of acceleration. However, none of these resemble a drag race. For one thing, these rides are mostly passive; the participant has little or no input into what is happening once the ride begins. Also, there is no contest between participants. The excitement of competition is missing. A drag race amusement ride that captures the acceleration, the pressure, and the excitement of competition fills this need. Such a ride must simulate the conditions of a real drag race, while remaining safe and accessible to the general public. Such a ride should nevertheless be so real and challenging that actual drag race drivers find it interesting as well as persons with no racing experience. Most important, it must be a genuine, interactive, timed drag race in an amusement ride setting.

U.S. Pat. No. 4,991,514 teaches the basic concepts of a electromagnetically powered drag ride attraction including a two lane track designed to look and operate like a real drag strip. However, that invention, as well as other prior art, fails to accurately simulate the racing car as found at a real drag race; rather, it teaches a linear induction motor propulsion method on a race car with no wheels. Real drag race vehicles have driven wheels and gearshifts. To simulate a drag race, the driver must have control over acceleration, and the driver must shift gears. Also, real drag races are timed and false starts are disqualified; therefore, an amusement ride that simulates a drag race must be timed, allow shifting, and allow the driver to control power to the wheels.

A great need exists for a drag race amusement action ride that accurately simulates a real drag race with driven wheels, acceleration controlled by the driver, computer controlled timing and safety features, and disqualification for false starts. Such a ride must be entirely safe for the general public, but it must be real enough and challenging enough to be interesting to an experienced drag race driver.

SUMMARY OF THE INVENTION

The present invention is directed to an improved, interactive drag strip amusement ride that satisfies the need for a ride where any person can safely experience the thrills of a drag race and the requirements placed on a drag race driver. It comprises an apparatus for accurately simulating a drag race from the perspective of the race driver.

The present invention's most important feature is the ability to allow the driver to actually win or lose the race by his driving skill. To perform well, a driver must respond well to the green light on the starting tree, must modulate the throttle and clutch to prevent "wheel spin," and must shift each of the two shift levers at the proper engine speed. The ride is truly interactive in that the drivers have virtually complete control over their cars during the race. They become, for all practical purposes, drag strip race drivers.

The present invention comprises cars that are accurate representations of real pro-stock drag racers with driven wheels, acceleration controlled by the driver, a system control, a computer controlled "Christmas tree" for starting the race, a timer for determining elapsed time, smoke to simulate burnout, simulated engine noise, simulated exhaust flames, false start disqualification for disqualifying drivers who cross the starting line before the green light, and an indicator means showing elapsed times.

As the amusement ride begins, the two drivers and any passengers enter two vehicles by passing a complete engine mock-up, along with the assorted racing components that complement a real drag racing vehicle, such as a fuel cell, dragster computer box, hoses, and wiring. After the participants are strapped into a safety harness, each vehicle is closed. The driver depresses the clutch and presses the starter button. He hears the simulated engine sound and begins to receive instructions.

Various sequences of instructions are possible during the ride. A typical sequence consists of first telling the driver no prepare for burn-out. Burn-out is a process where drivers heat up their tires. As the burn-out begins, the driver applies the brake, presses the "brake hold" button, and floors the throttle. The engine roars, and the vehicle is encompassed by smoke that seems to be coming from the rear tires. A hydraulic system shakes and tilts the vehicle to simulate a real burn-out at a drag strip. In a real drag race the smoke would come from the tires as they spin and heat; in the present invention the smoke can come from a smoke supply system.

Typically, after burn-out, the cars are moved forward to a pre-stage position and then to a stage position where the drivers begin watching the starting indicator or "Christmas tree", a vertical light tower, for the start of the race.

The Christmas tree may comprise red lights, orange lights, and green lights. The race typically begins on the green light; however, a winning drag race driver usually must anticipate the green light and press the accelerator hard while the orange light is still showing. However, if the driver crosses the starting line before the actual green light, a false start occurs, and that driver may be disqualified.

As the actual race starts, the driver floors the throttle while modulating the clutch to accelerate down the track. The simulated engine sound indicates increasing engine speed. When the tachometer reaches about 9500 RPM, he shifts a first gear lever without using the clutch. The RPM drops, and the engine sound changes. As the RPM again approaches about 9500, he shifts a second gear lever with similar results. At the end of an acceleration zone, the tachometer again reads near 9500 RPM. The car begins to slow, whether or not the throttle is depressed. The driver then hears instructions to apply the brakes. He slows the car and stops short of the end depressing the clutch to keep the engine running. In the present invention, throttle, clutch, and shift events effect the performance of the vehicles in a manner similar to vehicles in a real drag race. Thus, the winning driver must manipulate the shift correctly as well as start properly.

As the drivers cross a finish line at the end of the ride, a winner is declared based on the car with the fastest time or based on which car crossed the finish line first. An indicator shows the elapsed times of both cars and whether either was disqualified. A hydraulic jack on the bottom of the car may then turn the cars to face the opposite direction by lifting the car off the track and turning it. Each driver is then given a chance at a similar second race. This race is started by a second starting indicator and timed in the reverse direction. Finally when the cars reach the original starting point, the occupants disembark, and cars are again turned around, and the ride is ready for another race with different participants.

The invention contains many other features that are described in the following drawings and embodiments.

BRIEF DESCRIPTION OF THE DRAWINGS

For a more complete understanding of this invention, reference should now be made to the embodiments illustrated in greater detail in the accompanying drawings and described below by way of examples of the invention.

It should be understood, of course, that the invention is not necessarily limited to the particular embodiments illustrated herein.

DESCRIPTION OF THE PREFERRED EMBODIMENT

Figure 1:
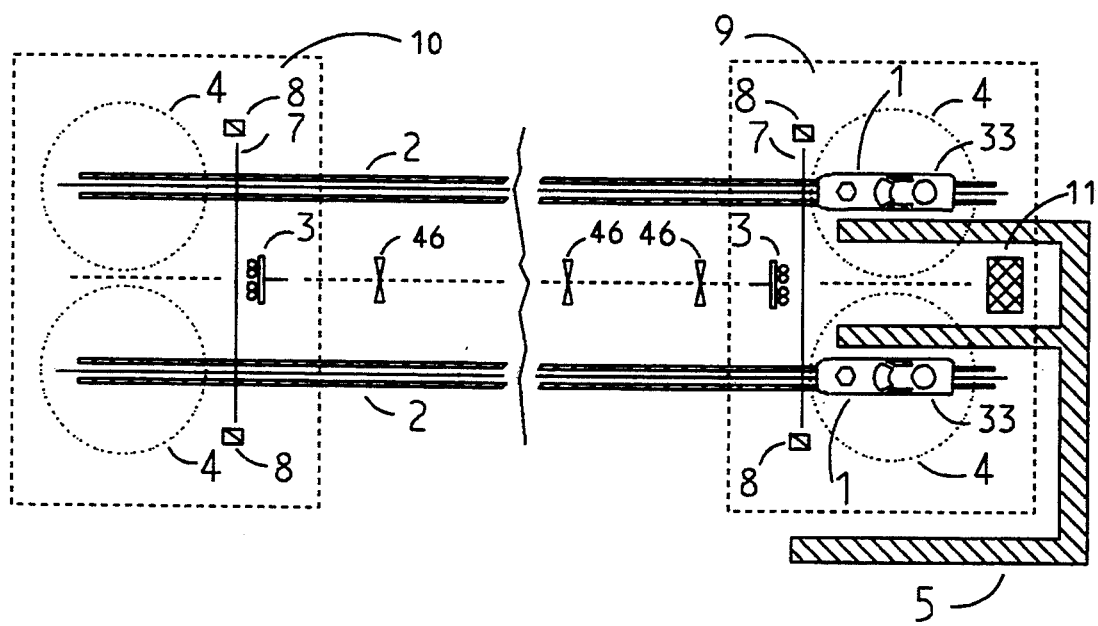
FIG. 1 shows a top view of a version of the invention including track and turnaround areas.

The present invention comprises an interactive amusement ride wherein participants become drivers and passengers in a drag race vehicle. FIG. 1 shows a top-down view of the invention. Two amusement ride vehicles 1 run parallel to one another along a linear race course 2 that may be of arbitrary length of from less than 400 feet to over 800 feet. The linear course 2 extends from a first area 9 to a second area 10.

Participants enter the ride vehicles 1 by means of a vehicle approach 5. The vehicle approach is simply a means for the participants to get from an entry point to the vehicles 1. This approach may be different in different embodiments of the invention; its sole purpose is to allow participants to approach and enter the ride vehicles 1.

As ride participants approach the vehicles 1, they may pass a complete and well defined engine mock-up 11 along with assorted racing components such as a fuel cell, dragster computer box, hoses, and wiring that complement a real racing vehicle. This mock-up adds to the reality of the ride and instructs the participants on what a real drag racer is like. This mock-up may be omitted in some embodiments of the invention.

After the participants are strapped into the race vehicles, they may wear headsets to damp out engine noise and receive instructions from the race controller. A typical sequence starts with instructions for burnout. Burnout is simulated by smoke and a hydraulic shaking of the vehicle. Smoke comes from generators 33 mounted in the vehicles. These are standard smoke generators known in the art. These smoke generators are controlled by the computer or the race controller. In a real drag race, the purpose of burnout is to heat the rear vehicle tires. The smoke and hydraulic shaking of the vehicles simulates burnout in the present invention. In addition, a sound system 46 may supply crowd sounds during the race. This feature is optional.

The race starting sequence is signaled to the drivers by a starting indicator means 3. This can be a full "Christmas tree" similar to those used at actual drag races comprising amber, green, and red lights and described in the 1993 NHRA Rulebook for drag racing, or it may be simpler. As the start sequence begins, the driver sees a descending series of amber lights or a single amber light.

The start of a race is indicated when the last amber light goes out and the green light illuminates on the starting indicator. At this point in time (or just slightly before it), the drivers must depress their accelerators to begin the race. Two parallel lines 7 orthogonally cross the linear course 2 to ace as start and finish lines. Any driver crossing the start line before the green light on the starting indicator 3 may be deemed disqualified from the actual competition by a "false start." The car is still allowed to race, but it may not be allowed to win.

Aligned with the start and finish lines are race timer means 8 for determining the elapsed time of each car from start to finish. These timers can comprise light beams or other methods known in the art. These are coupled to time the elapsed time of each car separately. Winners can be declared by which car crosses the finish line first or by which car had the least elapsed time. Drivers can also be handicapped by saving past records of their elapsed times as in a real drag race. In addition to providing race elapsed times, the timers 8 can provide reaction times for each driver. This is the time between the green light on the starting indicator 3 and when the vehicle crosses the start line 7.

As the drivers accelerate and race down the course, a sound system in the vehicles supplies engine and tire sounds, and an optional external sound system 46 may supply sounds from the crowd. In addition, optional strobe lights may be used to enhance the sensation of speed to make the participants feel as if they are moving faster than they are.

At each end of the course 2 are turnaround areas 4. Here the ride vehicles 1 can be rotated 180degrees so that they can race in either direction. Thus, different from a real drag race, each driver gets two chances to experience the ride. Turning the vehicles around at the far end 10 also provides a convenient way to return the vehicles to the starting point. In order to race in two different directions, there must be two starting indicators 3, and the control computer or race controller must reverse the functions of the start and finish lines 7 and race timers 8.

Figure 2:
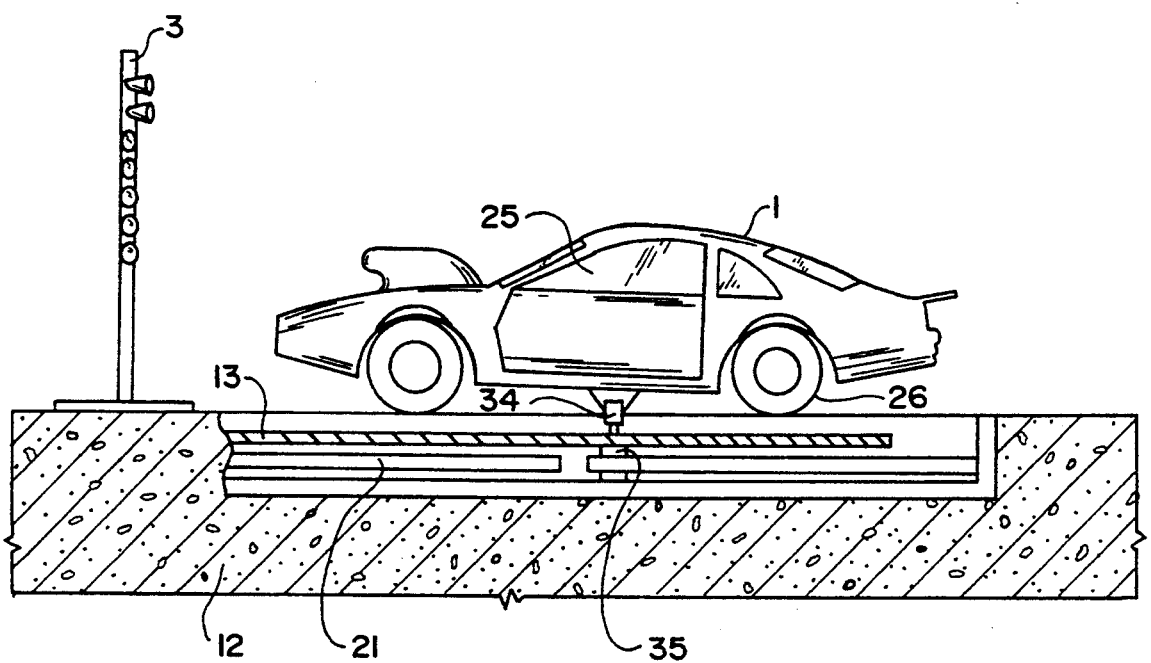
FIG. 2 shows an amusement ride vehicle that resembles real pro-stock race car along with a means for rotating the vehicle 180 degrees at either end of the linear course.

FIG. 2 depicts an amusement ride vehicle 1 modeled after a real pro-stock drag racer. Other race car models could also be used. The vehicle includes a passenger compartment 25 and driven wheels 26. An electrified channel or bus bar 13 is shown in a concrete well 12 under the car 1. This well 12 continues the length of the course in several sections. The bus bar 13 couples DC electric power to the car through collectors (not shown). A means for rotating the car 1 180 degrees at each end of the track is also shown. This comprises a pivot cylinder 34 with a rod passing through a guide bogie 35. A hydraulic jack (not shown) lifts the car so it can be turned.

Figure 3:
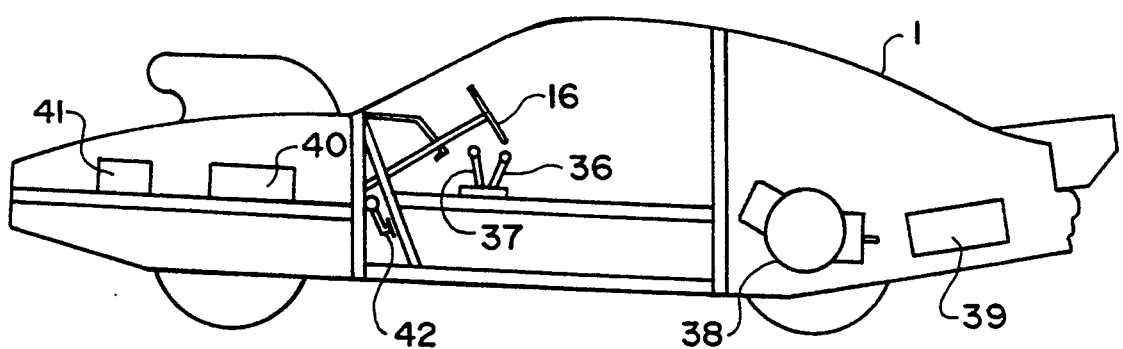
FIG. 3 is a section view of an amusement ride vehicle showing the motor and interactive controls used by the driver during the race.

FIG. 3 is a section view of the amusement ride vehicle. Each such vehicle contains a DC electric motor 38 similar to the AC-100 manufactured by AC Propulsion, Inc. of San Dimas, Calif. The motor is coupled to a transmission similar to the Honda CRX which is locked in first gear at a gear ratio of 9.59:1 (not shown). A motor controller 39 accepts a signal from the throttle to control acceleration. Regenerative braking may be used when the throttle backs off to 30%. The controller 39 will also reverse the direction of the motor and has interlocks to prevent shifting from neutral into forward or reverse while the car is in motion or the throttle is depressed. An accelerator pedal or throttle (not shown) allows the drivers to directly control the motor RPM during a race. The accelerator pedal together with the dual gearshift 36 and 37 allows each driver to become and interactive part of the race. For safety, DC power to the motors can be interrupted by the race controller at any time during a race. FIG. 3 also shows the steering wheel 16, and a brake pedal 42 that attaches to a standard hydraulic braking system similar to that found on automobiles.

Each car is equipped with a sound system 41 and a smoke generator 40 mounted in the front section. The sound system provides simulated engine noise, while the smoke generator is used to simulate smoke from the rear tires during burnout.

Figure 4:
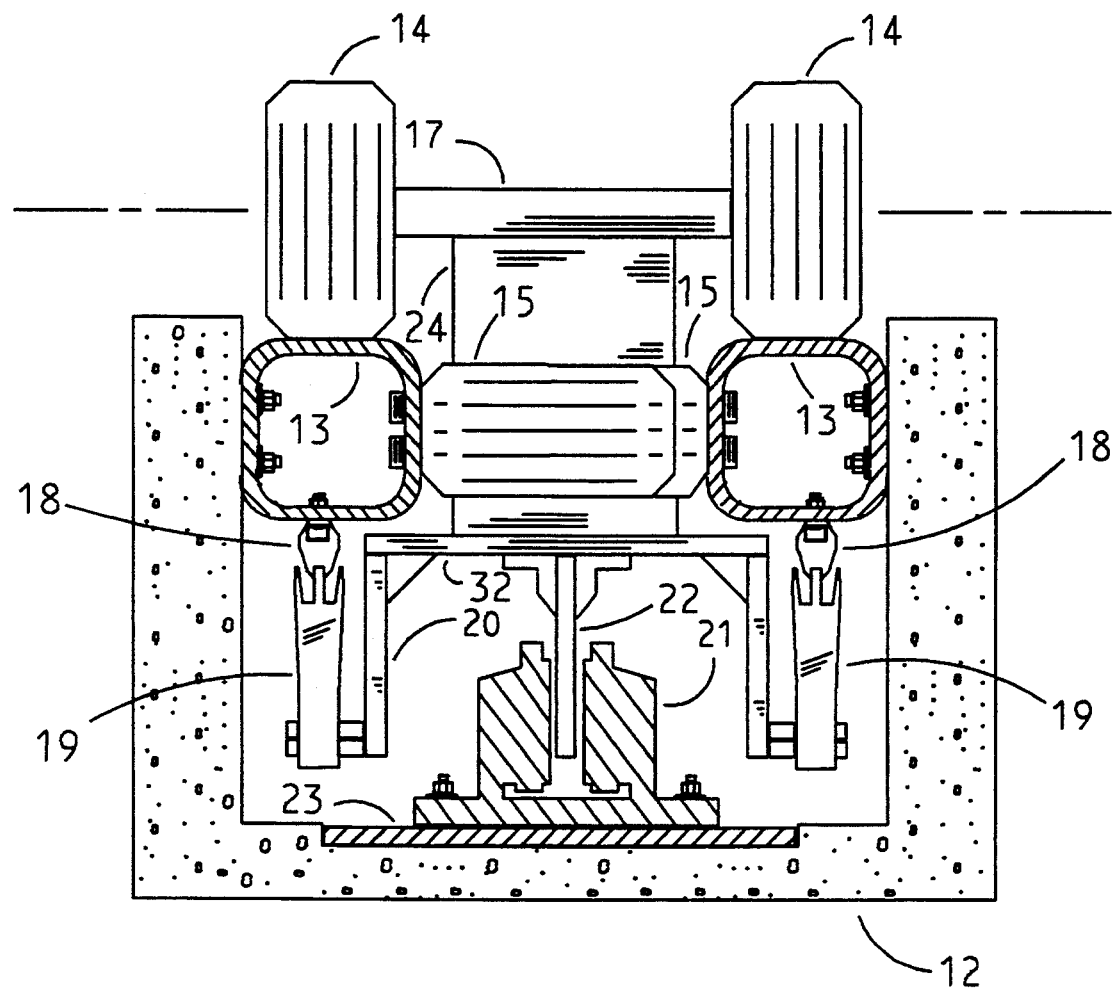
FIG. 4 depicts a possible section of the vehicle track showing the guidance, electrical pickup, and breaking means.

FIG. 4 is a section view of a portion of one off the two tracks in one version of the linear course. The amusement ride vehicle is not shown in FIG. 4, but is assumed to be mounted above the structure shown. The course is mounted in a concrete well 12 that forms a long channel. Mounted on to the side of the well 12 are two electrified metal channels 13 that are around four inches on a side that supply power to the vehicle. The vehicle is supported by four insulated load bearing wheels 14 that ride on the channels 13. The vehicle is guided in the course by four staggered guide wheels 15 that ride on the inside of the channel. These guide wheels 15 prevent the vehicle from moving sideways off of the course. A plate assembly 24, attached to the vehicle carriage 17 descends into the well 12. A cross member 32, with descending arm 20 connects the vehicle to two tandem collectors 19 similar to Howell model JA150. These tandem collectors 19 are suspended on two conductor/hangers 18 similar to Howell model JA500 and JA400P. The collectors 19 and hangers 18 are the electric pickup points that supply power to the vehicle.

In this embodiment there may be sets of pneumatic brakes 21 at the two ends of the course that can be used to slow and stop the vehicle. These brakes 21, if used, are mounted on a steel base plate 23 that is bolted into the concrete well 12. Descending from the vehicle crossbar 32 is a steel brake fin 22. As this fin 22 passes between the pneumatic brakes 21 the car can be safely stopped. In addition to the optional pneumatic brakes, the vehicle itself has brakes directly on the car wheels in a conventional manner using a standard hydraulic brake system similar to that found on automobiles. The driver has access to these brakes at all times; they can also be applied automatically as a safety feature if the driver fails to use them.

In an alternative embodiment of the invention, the track can be made portable. Instead of a concrete well, the invention is laid out directly on asphalt. The channel members 13 are bolted to a steel baseplate and the guide wheels 15 and 16 run on the outside of the channel 13. The conductor 18 and tandem collector 19 mount vertically to a extension that is welded or bolted to the channel 13. In this embodiment, track is fabricated into convenient length sections for removal and transport.

Figure 5:
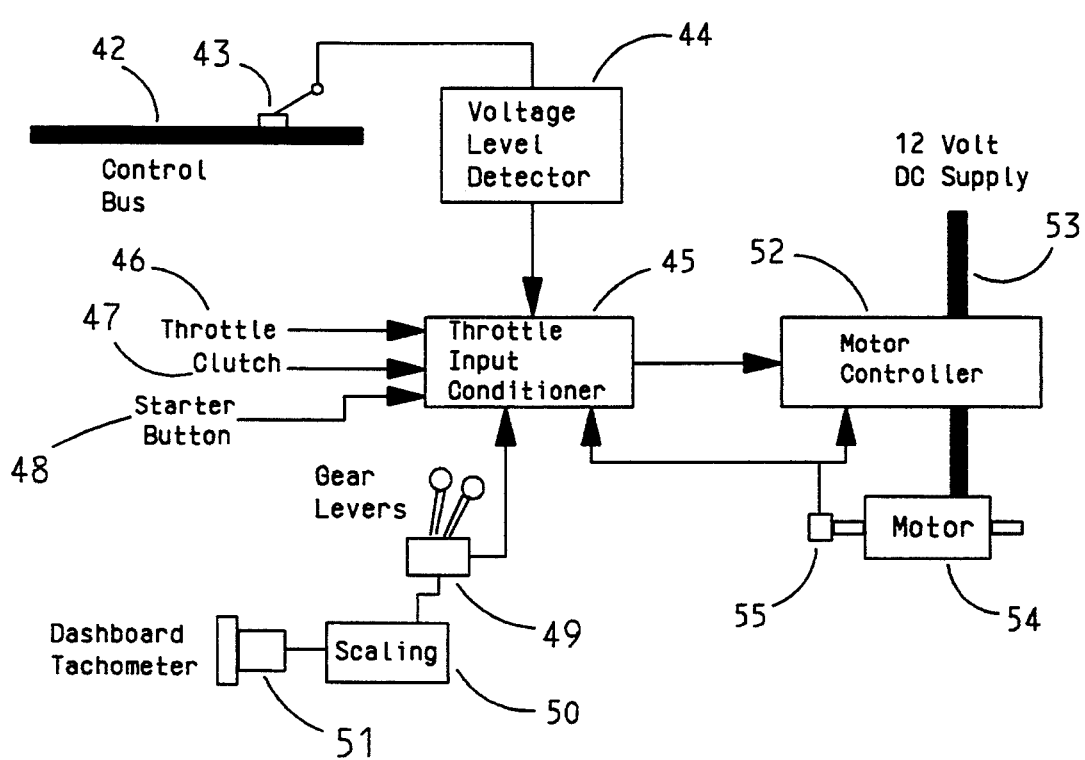
FIG. 5 is an block diagram of the vehicle control system.

FIG. 5 is a block diagram of the vehicle control system. A voltage level detector 44 decodes the voltage level on a special control bus 42 in the track. This control bus 42 carries various DC voltage levels to communicate with the vehicle. Voltage is taken from the control bus 42 with a collector 43 in a manner similar to the power buses. The voltage level detector sends signals to a throttle input conditioner 45 that considers the state of the throttle 46, the clutch 47, and the gear levers 49 as well as other inputs to set the RPM of the motor 54 via a motor controller 52. For a signal out of the throttle controller 45 to the motor controller 52, the engine must be started. This is a simulated condition where the starter button 48 is pressed with the clutch 47 depressed. Anytime thereafter, if the clutch is engaged more than about 20% with the throttle depressed less than about 20%, a simulated engine stall will occur resuiting in loss of engine audio and no voltage to the motor controller 52.

The throttle conditioner 45 normally provides a control voltage for the motor controller 52. The motor controller 52 controls the 12 volt supply current 53 to the motor 54. The motor 54 is equipped with an on-shaft tachometer 55 whose signal is fed back to the motor controller 52 and the throttle conditioner 45. Assuming the control bus 42 carries a signal "engine is running," and the direction selector (not shown) in the vehicle is in the forward position (as opposed to reverse), the throttle 46 directly provides a linear control voltage to the motor controller 52. The clutch 47 provides no input when engaged (pedal out) and a minus voltage that subtracts from the control voltage when not engaged (pedal in). If the combination of throttle and clutch voltage reaches a maximum before a predetermined time, the loss of traction (smoking of tires) is simulated by reducing the motor control voltage by around 20% along with the initiation of simulated tire smoke.

The throttle conditioner 45 also receives an input signal from a tachometer scaling circuit 50 and the gear levers 49. Interactive shifting of the gear levers by the driver is controlled by the throttle conditioner 45. If the first gear lever is shifted before the motor tachometer 55 reaches a certain, pre-determined RPM, the throttle voltage to the motor controller 52 is reduced 20% until that RPM is reached. If the second gear lever is shifted before the motor reaches a second pre-determined RPM, the throttle voltage is reduced 20% until that RPM is reached. Other signals may also inhibit the motor control voltage to the motor controller 52. These include, but are limited to, a lack of hydraulic pressure in the brake system, seat belts not latched, door(s) open, and brake hold button depressed.

A simulated tachometer 51 is mounted on the dashboard. This is driven by the tachometer scaling circuit 50. The tachometer is similar to a standard electronic tachometer such as those made by Mailory. When both gear levers 49 are up, the tachometer 51 reads three times the motor RPM. After shifting the first gear lever, the scale changes to 1.5 times the motor RPM. After shifting the second gear lever the ratio becomes 1:1. A signal generator is also included to provide tachometer input when the motor is not running.

Figure 6:
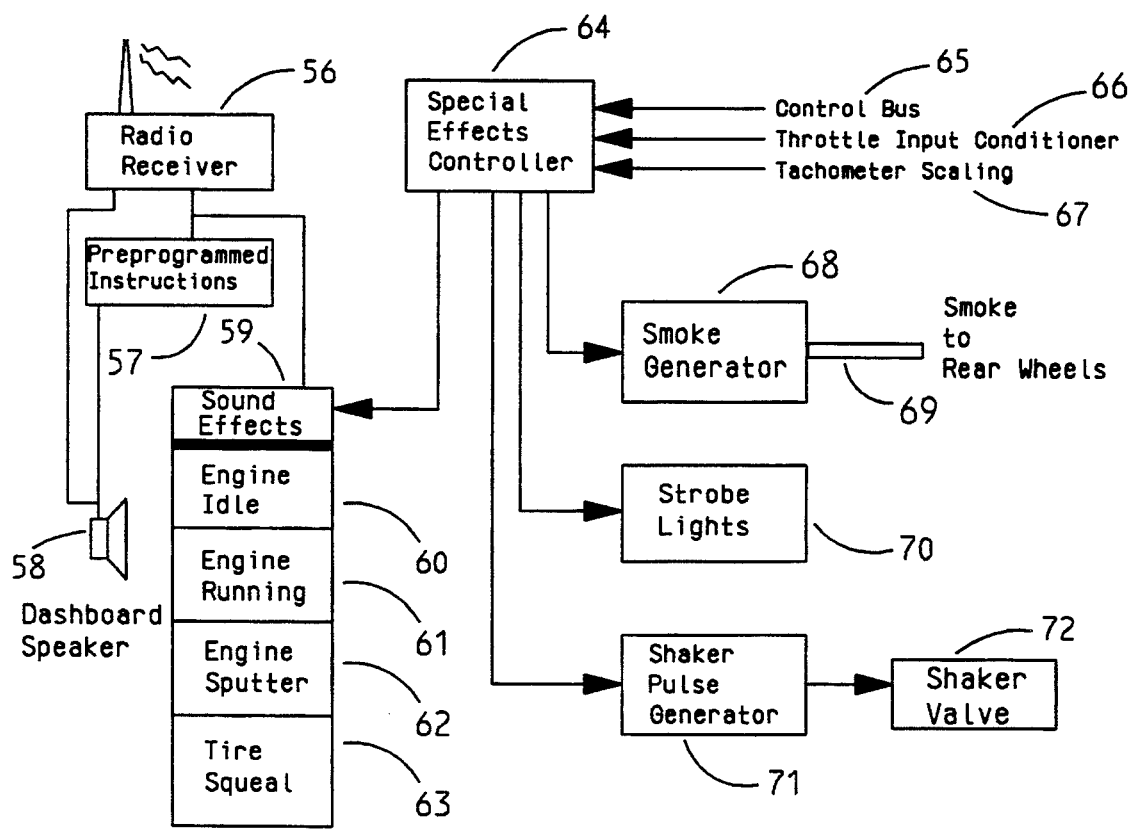
FIG. 6 is a block diagram of the special effects system.

FIG. 6 is a block diagram of the special effects systems. A radio receiver 56 receives voice commands from the race controller and outputs them to the driver through a dashboard loudspeaker 58 or through headphones worn by the driver. Preprogrammed instructions can also be played through the loudspeaker 58. A special effects controller takes signals 65 from the control bus 42 and is attached 66 to the throttle input conditioner 45 and attached 67 to the tachometer scaling circuit 50. The special effects controller 64 controls smoke from a smoke generator 68 that pipes smoke 69 to the rear tires, strobe lights 70 and a shaker pulse generator 71 that controls a shaker valve 72. In addition, the special effects controller 64 controls sound effects 59 that produce sounds of the engine idle 60, the engine running 61, the engine sputtering 62 and tires squealing 63. The engine sounds are controlled by the simulated RPM from the tachometer scaling circuit 67. The sound system produces a sound frequency which is proportional to the speed indicated on the dashboard tachometer.

The onboard smoke generator 68 supplies simulated tire smoke and simulated exhaust smoke. Tire smoke occurs during burn-out and when excessive power is applied at the start of the run. When smoke is being generated, the sound system adds the sound of squealing tires 63.

Strobe lights 70 light the inside of the exhaust and flash whenever smoke is emitted. A shaker pulse generator 71 causes a shaker valve 72 to cause shaking and tilting. Pulses of hydraulic pressure can simulate idle roughness and fast shaking during burn-out.

It is to be understood that the above-described arrangements are merely illustrative of the application of the principles of the invention, and that other arrangements may be devised by those skilled in the art without departing from the spirit and scope of the invention.

We claim:

1. An improved interactive drag strip simulation ride with at least two ride race vehicles, each vehicle powered by an onboard electric motor with clutch, throttle, gearshift, and simulated tachometer, and each vehicle containing at least one human occupant as a driver, said vehicles racing side by side along a linear course, the improvement comprising:

throttle input conditioner means coupled to the clutch and throttle for simulating power and speed control, said input conditioner means producing loss of vehicle speed as if caused by wheel slip when a driver fails to modulate the clutch and throttle as in a real race vehicle;

motor controller for controlling power and speed of the onboard electric motor;

means for coupling said throttle input conditioner means to the motor controller; the throttle input conditioner means simulating a power reduction when a driver shifts the gearshift before a predetermined RPM is indicated on said simulated tachometer.

2. The interactive drag strip simulation ride of claim 1 wherein the throttle input conditioner means simulates an engine stall when the clutch is engaged more than 20% and the throttle is engaged less than 20%.

3. The interactive drag strip simulation ride of claim 1 further comprising a sound system to simulate engine noise coupled to said throttle input conditioner means so that sound pitch increases during a speed reduction simulating wheel slip.

4. The interactive drag strip simulation ride of claim 1 further comprising artificial smoke means for simulating tire burn coupled to said throttle input conditioner means to produce smoke during simulated wheel slip.

* * * * *